United States Patent [19]

Savage

[11] 4,004,838
[45] Jan. 25, 1977

[54] VEHICLE HUB ASSEMBLY

[75] Inventor: Donald D. Savage, Huntsville, Ala.

[73] Assignee: B. J. Powell, Atlanta, Ga. ; a part interest

[22] Filed: Sept. 23, 1975

[21] Appl. No.: 616,068

Related U.S. Application Data

[62] Division of Ser. No. 439,736, Feb. 5, 1974, Pat. No. 3,907,053.

[52] U.S. Cl. .......................... 301/105 R; 301/114; 301/126; 295/43; 151/417; 151/69
[51] Int. Cl.² ....................................... B60B 27/06
[58] Field of Search .............. 301/105 R, 111, 112, 301/114–116, 117, 122, 126, 9 CN, 108 S, 108 SC; 295/43; 151/69, 41.7

[56] References Cited

UNITED STATES PATENTS 1,104,174   7/1914   Duffy ............................... 301/126

FOREIGN PATENTS OR APPLICATIONS 111,995   1917   United Kingdom .......... 301/111 X Primary Examiner—Stanley H. Tollberg
Assistant Examiner—Charles A. Marmor
Attorney, Agent, or Firm—B. J. Powell

[57] ABSTRACT

A hub construction for connecting a wheel and tire assembly to each of the drive shafts of a vehicle subassembly including a hub carrying the wheel and tire assembly adapted to be slidably received on the drive shaft, and a nut threadedly engaging the drive shaft to hold the hub in place, the hub and nut interconnected so that the nut withdraws the hub as it is removed.

1 Claim, 4 Drawing Figures

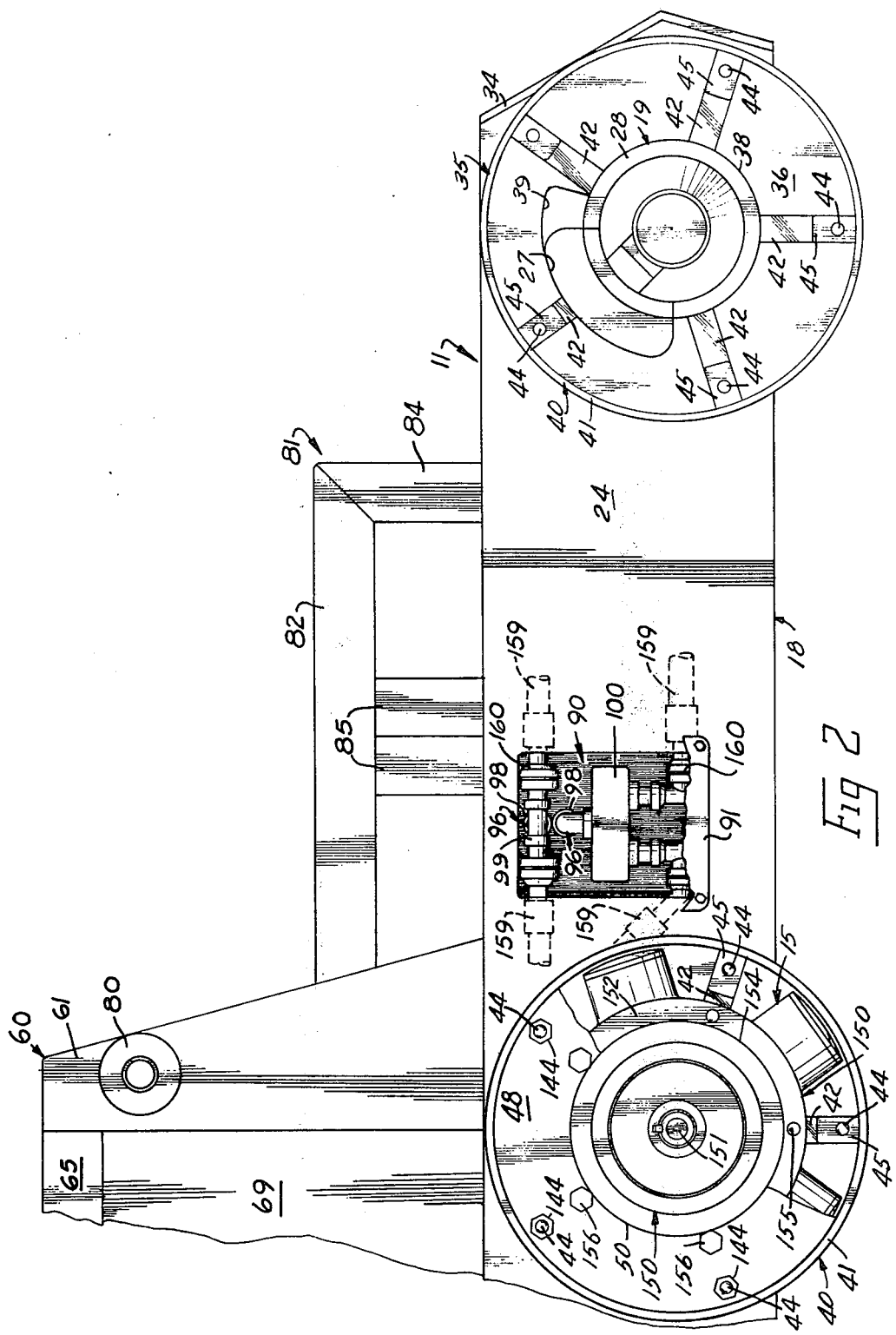

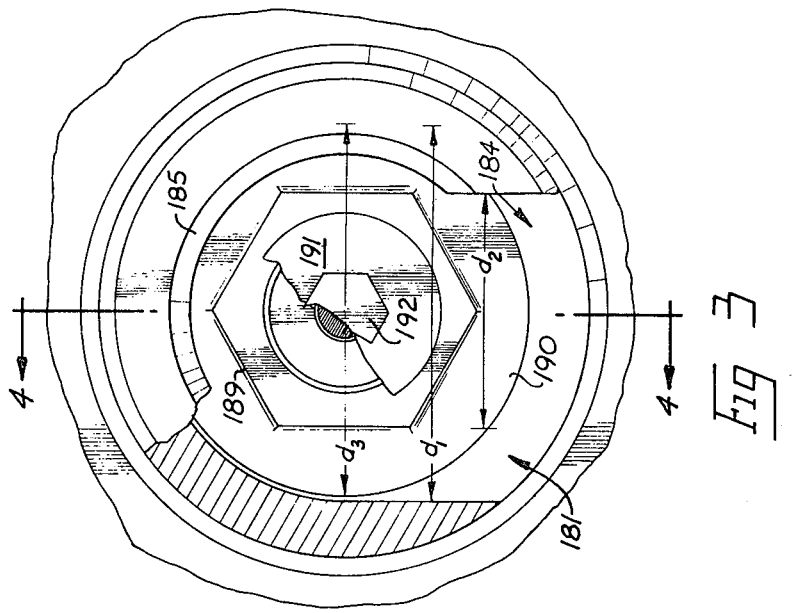
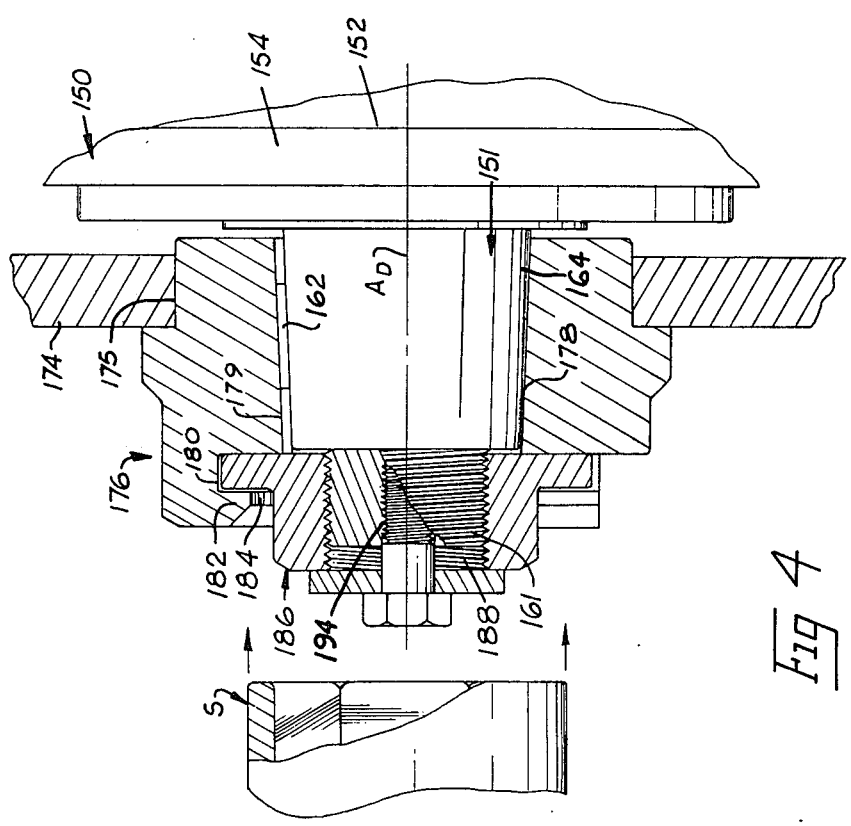

VEHICLE HUB ASSEMBLY

CROSS-REFERENCE TO RELATED APPLICATIONS

This application is a division of my co-pending application Ser. No. 439,736, filed Feb. 5, 1974 now U.S. Pat. No. 3,907,053 issued Sept. 23, 1975.

BACKGROUND OF THE INVENTION

Vehicles which use a base subassembly having independently driven wheels on opposite sides thereof are available on the market today. This general type of steering system is commonly known as the "skid steer" principle. Because such vehicles use an independent axle at each wheel on the opposite sides of the vehicle, large amounts of torque are generated within the frame of the base subassembly. The prior art base subassemblies have generally used a torque tube displaced from the rotational axis of the wheels in an attempt to compensate for the torque applied as the vehicle is operated. This has created problems in that a majority of the torque was applied directly to the frame of the base subassembly without being transmitted to the torque tube. Another problem with these prior art base subassemblies is the lack of accessibility to the components, especially the prime mover, in the base subassembly for maintenance and repair. This has required considerable down time while the subassembly was disassembled to reach the damaged component to repair same. Most of the prior art base subassemblies were designed for a single use so that if an attempt was made to mount different types of accessory equipment thereon as is frequently required in the economical operation of such equipment, this accessory equipment could not easily be mounted on the base subassembly without considerable remanufacture of the subassembly and/or, even if such equipment could be mounted, it could not be used without damage to the base subassembly. The wheel and tire assemblies of the prior art base subassemblies have also been difficult to remove.

SUMMARY OF THE INVENTION

These and other problems and disadvantages associated with the prior art are overcome by the invention disclosed herein in that a vehicle subassembly is provided which is capable of compensating for the torque applied to the subassembly even though separate drive shafts are used at each wheel, which has all of the components of the subassembly easily accessible for maintenance and repair, onto which various accessory equipment can be mounted easily. The wheel and tire assemblies are connected to the drive shafts with self-pulling hub constructions.

The apparatus of the invention comprises generally a base frame including a pair of spaced apart side rails joined by a pair of spaced apart torque tubes oriented along axes which coincide with the rotational axis of each of the wheels. A mounting assembly is connected to opposite ends of each of the torque tubes as well as to the side rail at the end of the torque tube for mounting the drive motor for each of the wheels. A ground engaging wheel and tire assembly is mounted on each of the drive motors so that the wheel and tire assembly rotates about the axis of its associated torque tube. A prime mover module is operatively connected to each of the drive motors to drive the subassembly according to the skid steer principle. A hub construction is provided for connecting each wheel and tire assembly to each of the drive shafts of a vehicle subassembly which includes a hub carrying the wheel and tire assembly adapted to be slidably received on the drive shaft, and a nut threadedly engaging the drive shaft to hold the hub in place, the hub and nut interconnected so that the nut withdraws the hub as it is removed.

These and other features and advantages of the invention will become more clearly understood upon consideration of the following specification and accompanying drawings wherein like characters of reference designate corresponding parts throughout the several views and in which:

BRIEF DESCRIPTION OF THE DRAWINGS

FIG. 2 is a side elevational view similar to FIG. 1 with some of the wheel and tire assemblies as well as the drive motors removed;

FIG. 3 is a front view of the hub assembly of the wheel and tire assembly; and,

FIG. 4 is a cross-sectional view taken along line 4—4 in FIG. 3.

Figure 1:
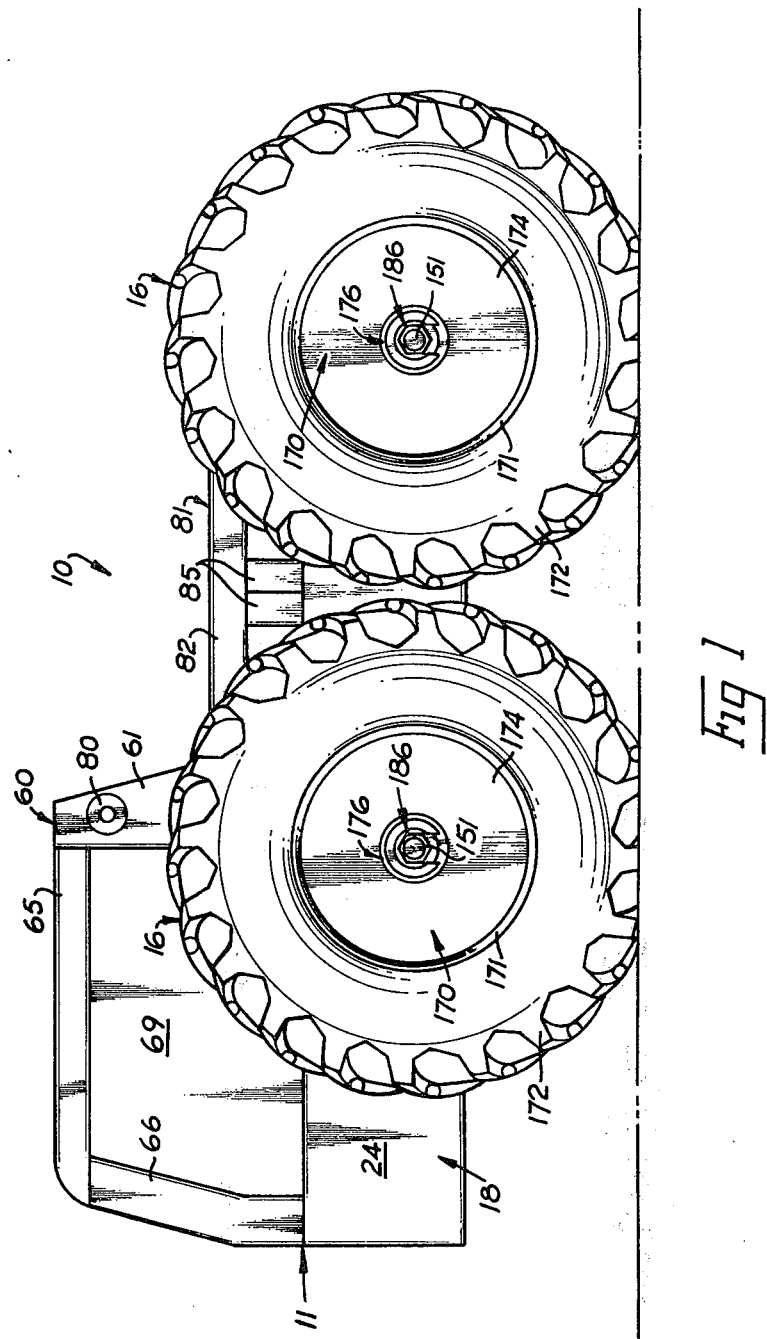
FIG. 1 is a side elevational view of a base subassembly embodying the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, it will be seen that the invention is a vehicle subassembly 10 which supports a vehicle and provides the operational power to the vehicle. The vehicle subassembly 10 includes generally a base frame 11, a plurality of drive means 15 carried by the base frame 11 and a wheel and tire assembly 16 carried by each drive means 15. An appropriate prime mover and module (not shown) operates the drive means 15 so as to selectively drive the wheel and tire assemblies 16 to propel the vehicle subassembly 10. The construction of the frame 11 and prime mover module are more fully disclosed in my application Ser. No. 439,736 and such disclosure is incorporated herein by reference.

BASE FRAME

The base frame 11 as best seen in FIGS. 1 and 2 includes a pair of spaced apart side rails 18 joined by a pair of spaced apart torque tubes 19. Each of the side rails 18 is tubular with a generally rectangular cross-sectional shape. The side rails 18 are positioned by the torque tubes 19 so that their longitudinal centerlines are generally parallel to the longitudinal centerline of the vehicle subassembly 10. For sake of simplicity, the left end of subassembly 10 as seen in FIG. 1 will be called the front end, it being understood that either end may be used as the front end in operation.

The torque tubes 19 are tubular with an annular side wall 25 and are arranged so that the centerline of each of the tubes 19 coincides with the drive axis $A_D$ of the vehicle subassembly 10 as will become more apparent. It will also be noted that the centerline of each of the torque tubes 19 is arranged substantially normal to the longitudinal centerline of the vehicle subassembly 10. Each torque tube 19 extends through aligned openings in both the side rails 18 and are affixed to both the inside and outside walls of the side rails by conventional means such as welding. The outside ends 28 of the torque tubes 19 project slightly beyond the outside side rails 18 as will become more apparent. An arcuate access cutout 27 is formed in the outside wall as seen in FIG. 2 of the side rails 18 at its juncture with the outside ends 28 of the torque tubes 19 and also in the ends 28 of the torque tubes 19 as will become more apparent.

A mounting unit 35 as seen in FIG. 2 is carried on the projecting ends 28 of each of the torque tubes 19 adjacent the outside wall of the side rails 18. The mounting unit 35 serves to mount the drive means therein as will become more apparent. Each mounting unit 35 includes an annular transfer disc 36 defining an inside opening 38 to receive the projecting end 28 of the torque tube 19 therein and is attached to the projecting end 28 of the torque tube 19 by welding. An access opening 39 is provided in the transfer disc 36 adjacent the inside opening 38 in registration with the access cutout 27 in the side rail 18 as will become more apparent. Each of the transfer discs 36 is also welded to the outside wall of the side rails 18 so as to fixedly attach the disc 36 to both the torque tube 19 and the side rail 18. It will be noted that the transfer disc is tangent to the top of the side rail 18 and projects below the bottom of the side rail 18. A spacer ring 40 having an annular side wall 41 with an inside diameter substantially equal to the outside diameter of the transfer disc 36 is welded to the outer peripheral edge of the transfer disc 36 and extends outwardly therefrom concentrically about the drive axis $S_D$. A plurality of inwardly projecting support blocks 42 are attached to the inside of side wall 41 and circumferentially spaced thereabout and also attached to the transfer disc 36. An outwardly extending threaded stud 44 is provided on the outer face 45 of each of the blocks 42. The faces 45 of the blocks 42 lie in a plane substantially normal to the drive axis $A_d$ and spaced just outwardly of the outer edge 46 of the spacer ring 40. A disc-shaped motor mount 48 having a diameter substantially equal to the diameter of the transfer disc 36 is positioned on the threaded studs 44 through lug holes through the motor mount 48. The lug holes are arranged so that the motor mount 48 is concentrically located with respect to the drive axis $A_D$ and a drive axle opening 50 is centrally located in the motor mount 48 as will become more apparent. A second inner series of motor mount holes are provided about the opening 50 to mount the drive means 15 on the motor mount 48 as will become more apparent.

DRIVE MEANS

Each drive means 15 is a hydraulic drive motor 150, one drive means 15 being mounted in each of the mounting units 35 as seen in FIG. 2. The drive motors 150 are conventional fixed displacement piston motors and provided with a single output drive shaft 151 centrally extending through a mounting flange 152. The drive motors 150 also have a circular support shoulder 154 adjacent the mounting flange 152 with the drive axle opening 50 in the motor mount 48 being sized to just receive the support shoulder 154 therethrough with the mounting flange 152 lying behind the motor mount 48 about the opening 50. Threaded holes 155 are provided through the mounting flange 152 which are selectively registrable with the motor mount holes in the motor mount 48 so that support bolts 156 received through the motor mount holes threadedly engage the holes 155 to attach the motor 150 to the inside of the motor mount 48. The hyraulic ports (not shown) to the motor 50 are located within the access openings 27 and 39 and connected to the prime mover module (not shown) through flexible hoses 159 with a quick-disconnect fitting 160 as will become more apparent. Thus, it will be seen that each hydraulic motor 150 is mounted on the motor mount 48 with the drive shaft 151 projecting through the opening 50 therein so that the drive shaft 151 rotates about the drive axis $A_D$ extending through the torque tubes 19. The drive shaft 151 is provided with a threaded end 161 seen in FIG. 4 to mount the wheel and tire assembly 16 as will become more apparent. Also, it will be noted that shaft 151 is provided with a tapered support section 164 to support the wheel and tire assembly 16 thereon and a key 162 is provided at section 164 to drivingly connect the wheel and tire assembly 16 to the shaft 151 as seen in FIG. 4.

One of the hoses 159 to each of the motors 150 on each side rail 18 passes inside the rail 18 and is connected to the T-fitting 99 through its quick-disconnect fitting 160 and the other of the hoses 159 to each of the motors 150 on each side rail 18 passes inside the rail 18 and is connected to the combiner/divider valve 100 through its quick-disconnect fitting 160. This allows the motors 150 to be easily disconnected at the fittings 160 to facilitate removal of the motors.

The motors 150 are attached to the motor mounts 48 and then the motor mount 48 attached to the blocks 42 by lug nuts 144 engaging the studs 44 as seen in FIG. 2. This also facilitates removal of motors 150 since they can be supported through the motor mounts 48.

WHEEL AND TIRE ASSEMBLY

A wheel and tire assembly 16 as seen in FIGS. 1, 3 and 4 is mounted on the projecting end of each of the output drive shafts 151 of the drive motors 150. Each wheel and tire assembly 16 includes a hub assembly 170 onto which is mounted a conventional rim 171 which in turn mounts an off-the-road rubber tire 172. The hub assembly 170 is attached to the inside outer edge of the rim 171 and includes a circular support plate 174 which is attached to the rim and extends inwardly therefrom. A central opening 175 is provided through the plate 174 and into which is mounted a hub 176 which is welded to the plate 174 about the opening 175. The hub 176 defines a central passage 178 therethrough which is tapered to be received on the tapered support portion 164 of the drive shaft 151 to support the wheel and tire assembly 16 so that the support plate 174 is generally normal to the drive axis $A_D$ extending through the drive shaft 151. This supports the wheel and tire assembly 16 so that the rim 171 and tire 172 extend back over and around the spacer ring 40. A key slot 179 is defined in the hub 176 at the central passage 178 to receive the key 162 on shaft 151 therein to drivingly connect the shaft 151 with the hub 176.

The hub further defines a generally semicircular recess 180 therein arranged in a plane generally normal to the drive axis $A_D$ at approximately the juncture of the tapered support portion 164 and threaded end 161 of the drive shaft 151. The recess 180 has open mouth 181 of width $d_1$ extending outwardly through the hub 176 and a generally semicircular flange 182 is provided outboard of the recess 180 with an opening 184 therein of a width $d_2$ less than width $d_1$ that is generally aligned with the open mouth 181 to the recess 180. The outside inner edge 185 of flange 182 is inwardly tapered as will become more apparent.

A hub nut 186 is provided which threadedly engages the threaded end 161 of the drive shaft 151 to force the hub 176 onto the tapered support portion 164 to mount the wheel and tire assembly 16 on the shaft 151. The hub nut 186 is internally threaded at 188 to threadedly engage the threaded end 161 and is provided with conventional hexagonal wrenching surfaces 189 to receive a conventional socket S partly shown in FIG. 4 to tighten and loosen the nut 186. The innermost end of the nut 186 is provided with a circular flange 190 having an outer diameter $d_3$ just slidably receivable into the semicircular recess 180 through the open mouth 181. The minimum outside diameter between opposed wrenching surfaces 189 of the nut 186 is substantially equal or slightly less than the width $d_2$ of the opening 184 in the semicircular flange 182 so that the circular flange 190 can be slipped into the semicircular recess 180 behind the flange 182 since the nut 186 can be oriented so that wrenching surfaces 189 pass through the opening 184. Thus, it will be seen that as the hub nut 186 is tightened onto the threaded end 161 of the drive shaft 151, the circular flange 190 will force the hub 176 onto the tapered support portion 164 to position the wheel and tire assembly 16 onto the output shaft 151 of the drive motor 150. It will also be noted, however, that as the nut 186 is loosened, the circular flange 190 on the nut will engage the semicircular flange 182 on the hub 176 and forcibly withdraw the hub 176 and thus the wheel and tire assembly 16 from the tapered support portion 164 of the drive shaft 151. Thus, field removal and replacement of a wheel and tire assembly 16 is greatly facilitated since the hub 186 and hub construction 176 have a built-in hub puller. A circular locking plate 191 and locking bolt 192 are provided to lock the nut 186 onto shaft 151. The threaded end 161 of the output shaft 151 is internally threaded at 194 so that the locking bolt can be tightened in the threads 194 to cause the locking plate 191 to engage the outside edge of the hub nut 186 to lock it in position. This prevents the wheel and tire assembly 16 from inadvertently coming off of the drive shaft 151 of drive motor 150.

I claim:

1. A hub construction for attaching a wheel to a drive shaft having a support portion and a threaded engagement portion comprising:

a hub carrying the wheel defining a central passage therethrough adapted to be received on the support portion of the drive shaft to support the wheel on the drive shaft, a semicircular recess oriented generally normal to said passage at one end of said passage of a first diameter larger than the diameter of said passage, an access opening through said hub to said recess of a width substantially equal to said first diameter; said hub further including an annular flange adjacent said recess opposite said passage and defining an inside opening smaller in diameter than said first diameter, larger in diameter than the diameter of said passage, and concentrically arranged with respect to said passage, said annular flange further defining a cutout therethrough communicating with said access opening with a width less than the width of said access opening, said cutout centered with respect to said access opening; and, a hub nut internally threaded to engage the threaded engagement portion of the drive shaft, said nut including a circular flange at one end thereof adapted to be received in said semicircular recess through said access opening and restrained against movement axially away from said passage by said annular flange, and a smaller diameter wrenching portion receivable through said cutout into said inside opening.

* * * * *